United States Patent
Sundararaman et al.

(10) Patent No.: US 11,334,258 B2
(45) Date of Patent: May 17, 2022

(54) SYSTEM AND METHOD FOR MEMORY REGION PROTECTION

(71) Applicant: Marvell Asia Pte, Ltd., Singapore (SG)

(72) Inventors: Ramacharan Sundararaman, San Jose, CA (US); Nithyananda Miyar, San Jose, CA (US); Hakseon Lee, Kanata (CA)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/162,046

(22) Filed: Jan. 29, 2021

(65) Prior Publication Data
US 2021/0389884 A1 Dec. 16, 2021

Related U.S. Application Data

(60) Provisional application No. 63/037,473, filed on Jun. 10, 2020, provisional application No. 63/037,484, filed on Jun. 10, 2020.

(51) Int. Cl.
*G06F 3/06* (2006.01)

(52) U.S. Cl.
CPC .......... *G06F 3/0622* (2013.01); *G06F 3/0644* (2013.01); *G06F 3/0679* (2013.01)

(58) Field of Classification Search
CPC .... G06F 3/0622; G06F 3/0634; G06F 3/0637; G06F 3/0644; G06F 3/0673; G06F 3/0679

USPC .......... 711/145, 152, 156, 163, 164
See application file for complete search history.

(56) References Cited

U.S. PATENT DOCUMENTS

| | | | |
|---|---|---|---|
| 2007/0267504 A1* | 11/2007 | Beeson | G06Q 20/3674 235/492 |
| 2014/0317372 A1* | 10/2014 | Herrick | G06F 12/1458 711/163 |
| 2015/0301761 A1* | 10/2015 | Sijstermans | G06F 3/0644 711/163 |
| 2020/0301590 A1* | 9/2020 | Bell | G06F 3/0659 |

* cited by examiner

*Primary Examiner* — Gary J Portka

(57) ABSTRACT

A new approach is proposed to support hardware-based memory region protection for an electronic device. One or more sources/requesting access to a memory/storage that is local to or associated with the electronic device are categorized into at least two types—a set of trusted sources and a set of untrusted sources. Accordingly, a memory manager is configured to partition the memory into a plurality of regions including at least a secure region that is accessible only by a trusted source and a non-secure region that is accessible by an untrusted source. Any access attempt to the secure region by one of the untrusted sources will be blocked. During operation, the memory manager is configured to dynamically adjust the demarcation and/or size of the secure region and the non-secure region of the memory via remapping of the memory based on current access need to data maintained in the memory.

26 Claims, 3 Drawing Sheets

300

```
┌─────────────────────────────────────────────────────┐
│ Maintain certain data associated with an electronic │
│ device via a memory, wherein the memory is          │
│ partitioned into a plurality of memory regions      │
│ including a secure region and a non-secure region   │
│                         302                         │
└─────────────────────────────────────────────────────┘
                          │
                          ▼
┌─────────────────────────────────────────────────────┐
│ Generate and transmit an access request by a source │
│ for read or write access to one region of the       │
│ plurality of memory regions, wherein the source is  │
│ categorized into one of a plurality of source       │
│ types, wherein the source type of the source is     │
│ transmitted with the access request                 │
│                         304                         │
└─────────────────────────────────────────────────────┘
                          │
                          ▼
┌─────────────────────────────────────────────────────┐
│ Accept the access request with the source type from │
│ the source and identify the memory region to be     │
│ accessed for a read or write operation              │
│                         306                         │
└─────────────────────────────────────────────────────┘
                          │
                          ▼
┌─────────────────────────────────────────────────────┐
│ Determine whether to grant or deny read or write    │
│ access to the memory region by the source based on  │
│ the source type of the source requesting access and │
│ the memory region to be accessed                    │
│                         308                         │
└─────────────────────────────────────────────────────┘
```

FIG. 3

SYSTEM AND METHOD FOR MEMORY REGION PROTECTION

CROSS-REFERENCE TO RELATED APPLICATIONS

This application claims the benefit of U.S. Provisional Patent Application Nos. 63/037,473 and 63/037,484, both were are filed Jun. 10, 2020 and incorporated herein in their entireties by reference.

This application is related to co-pending U.S. patent application Ser. No. 17/162,521, filed Jan. 29, 2021, which is incorporated herein in its entirety by reference.

BACKGROUND

Device security is becoming more and more important given the prevalence use and the personal nature of electronic devices. Any gap in security of an electronic device may expose the electronic device to a malicious attack. In some cases, the data and/or software (e.g., firmware) of the electronic device may be stored in a memory/storage (e.g., a nonvolatile memory such as a ROM or a flash device, or a volatile memory such as a DRAM) local to the electronic device and may be accessed and updated by multiple sources from an external platform/device/system, e.g., ARM CPU cores, Power Management Controller (PMC) etc. The local memory containing the data or software of the electronic device needs to be protected from unauthorized or untrusted external source access or attacks. In some cases, the local memory of the electronic device may be exposed to the external platform/device/system over one or more interfaces and thus providing an attack surface for an attacker to directly attack the electronic device or indirectly through an escalation of access privilege to the electronic device. For non-limiting examples, an interface through which the attack can be launched includes but is not limited to a Peripheral Component Interconnect Express (PCIe) interface for connecting high-speed components of the platform, and an Inter-Integrated Circuit (I2C) interface, which is a serial two-wire interface to connect low-speed devices such as microcontrollers, EEPROMs, A/D and D/A converters, I/O interfaces and other similar peripherals in the electronic device. If attacked, the local memory of the electronic device may cause a security issue, e.g., a Denial of Service (DOS) attack and/or leak of information of the electronic device, thus putting the electronic device in an unsafe operation or resulting in loss of intellectual properties (IPs).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 depicts a flowchart of an example of a process to support hardware-based memory region protection mechanism according to one aspect of the present embodiments.

DETAILED DESCRIPTION

Figure 1:
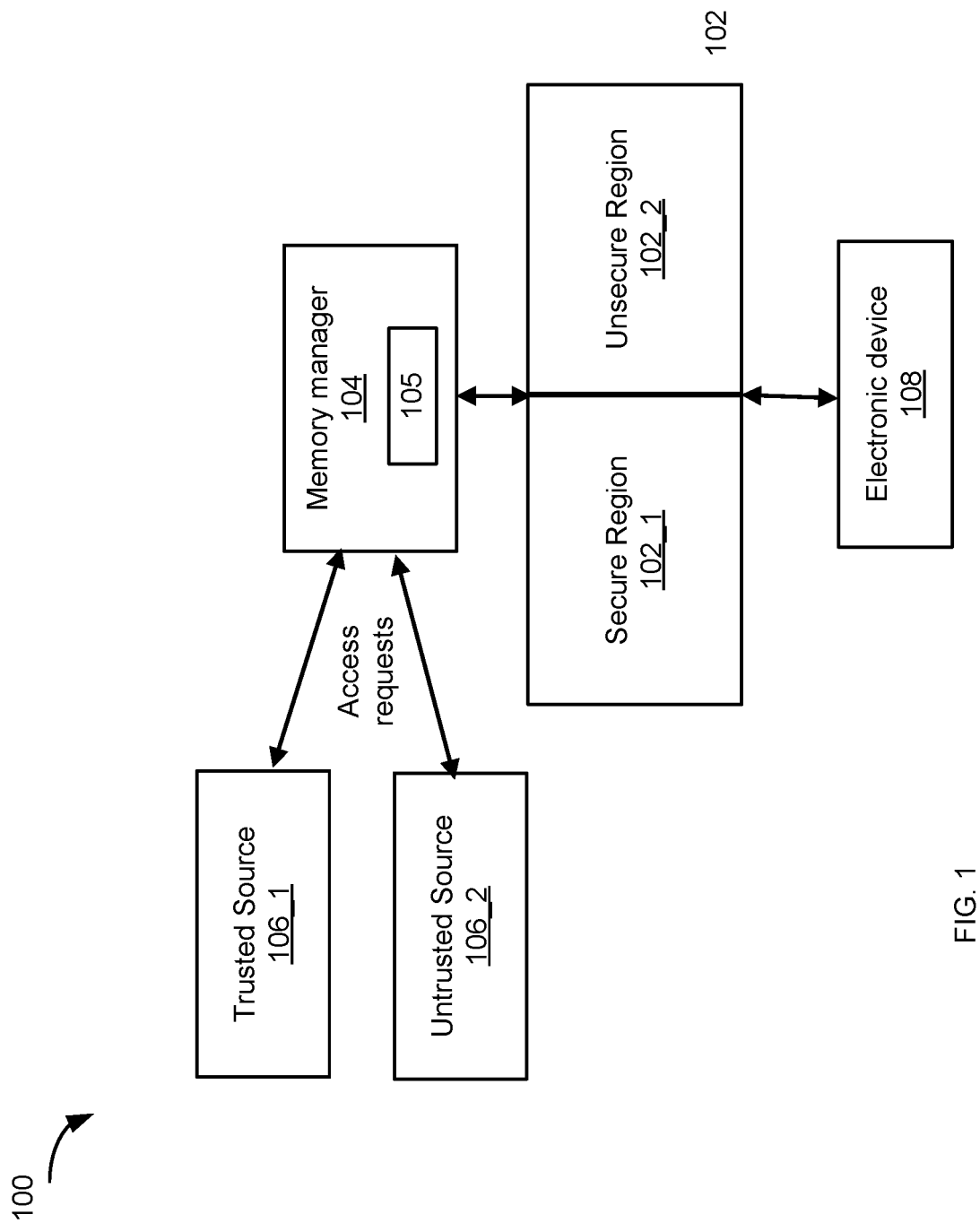
FIG. 1 depicts an example of a diagram of a hardware-based memory region protection mechanism according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new approach is proposed that contemplates systems and methods to support hardware-based memory region protection for an electronic device. Under the approach, one or more sources/agents (e.g., software/components/processors) requesting access to a memory/storage that is local to or associated with the electronic device are categorized into at least two types—a set of trusted sources and a set of untrusted sources. Accordingly, a memory manager is configured to partition the memory into a plurality of regions including at least a secure region that is accessible only by a trusted source (e.g., a trusted firmware on the electronic device) and a non-secure region that is accessible by an untrusted source (e.g., an internal direct memory access (DMA) engine of the electronic device). Any access attempt to the secure region by one of the untrusted sources will be blocked. During operation, the memory manager is configured to dynamically adjust the demarcation and/or size of the secure region and the non-secure region of the memory via remapping of the memory based on current access need to data and/or software of the electronic device maintained in different regions of the memory.

Under the proposed approach, the memory local to the electronic device is partitioned to include at least a secure region and a non-secure region for access by different types of agents/sources to ensure data and/or software security of the electronic device. Furthermore, the demarcation and size of the secure region and the non-secure region can be adjusted and/or programmed dynamically, making the memory regions resizable and adjustable at runtime to accommodate access need to the resources maintained in different regions of the memory. Additionally, since the proposed mechanism is hardware enforced, the security of the data and/or software in the different regions of the memory is strengthened.

Although data and/or firmware stored in a memory is used as a non-limiting example of resources maintained in the memory in the embodiments described below, it is appreciated that the same or similar approach/mechanism is equally applicable to other types of resources and/or components to strengthen their securities.

FIG. 1 depicts an example of a diagram of a hardware-based memory region protection mechanism 100. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the hardware-based memory region protection mechanism 100 includes a memory/storage (unit or component) 102, a memory manager 104, and one or more sources 106s. Each of these components in the hardware-based memory region protection mechanism 100 is a dedicated hardware block/component or a software running on such hardware block/component. In some embodiments, one or more of these components are programmable by a user at a host (not shown) via software instructions for various operations. When the software instructions are executed, the one or more hardware components becomes a special purposed hardware component for practicing certain machine learning functions.

In the example of FIG. 1, each of the one or more sources (or agents/components) 106s is a hardware component or a software component running on a hardware. For a non-limiting example, one of the one or more sources 106s can be a software component, e.g., a sideband firmware configured to make changes to and/or repair or update a firmware image stored on the memory 102 of an electronic device 108. For another non-limiting example, one of the one or more sources 106s can be a hardware component, e.g., a component of a processor/processing core such as an ARM core. In the example of FIG. 1, the memory 102 can be but is not limited to a nonvolatile storage device such as a flash device or an SSD drive or a volatile storage device such as DRAM configured to store and maintain certain data including but not limited to one or more of status, information, and/or software (e.g., a firmware image) related to operations, security, and/or intellectual property (IP) of the associated electronic device 108. The one or more sources 106s are configured to request access to the data and/or software maintained in the memory 102 via an access request as discussed below. Here, the electronic device 108 can be but is not limited to a computing device, a communication device, and a storage device. In some embodiments, one or more of the memory 102, the memory manager 104, and the sources 106s reside within the electronic device 108. In some embodiments, one or more of the memory 102, the memory manager 104, and the sources 106s reside outside of the electronic device 108 and communicate with the electronic device 108 and each other over one or more communication links and/or networks (not shown).

In some embodiments, the one or more sources 106s are categorized into one or more of a plurality of source types including but not limited to trusted sources 106_1 and untrusted sources 106_2. Here, a trusted source 106_1 is a source trusted by the electronic device 108 to securely access a secure region 102_1 of the memory 102. For a non-limiting example, the trusted source 106_1 can be a trusted application processor and/or a firmware of the electronic device 108. For another non-limiting example, the trusted source 106_1 can be a secure test-port following an industrial standard, e.g., Joint Test Action Group (JTAG) for verifying designs and testing of the electronic device 108. An untrusted source 106_2, on the other hand, is a source that is untrusted by the electronic device 108 and is not allowed to access (e.g., blocked from accessing) the secure region 102_1 of the memory 102. The untrusted source 106_2 is only allowed to access a non-secure region 102_2 of the memory 102. For non-limiting examples, an PCIe, a sideband master, an DMA engine, or a configuration generation master may be blocked out from accessing the secure region 102_1 by the memory manager 104. In some embodiments, an untrusted source 106_2 may attempt to initiate access to the memory 102 over a non-secured link or interface such as a PCIe interface or an I2C interface. In some embodiments, each of the one or more sources 106s is assigned with one or more source bits to identify the type of the source 106 (e.g., trusted or untrusted). In some embodiments, the source bits assigned to each source 106 are maintained within a hardware component (e.g., a bit register, a lock unit, or a storage unit) associated with a source 106, wherein the hardware component cannot be modified by software to prevent hacking via malicious software. In some embodiments, the number of source bits can be adjusted dynamically (e.g., increased) at runtime to accommodate additional types of source categorization for allowable register read and/or write access requests.

Figure 2:
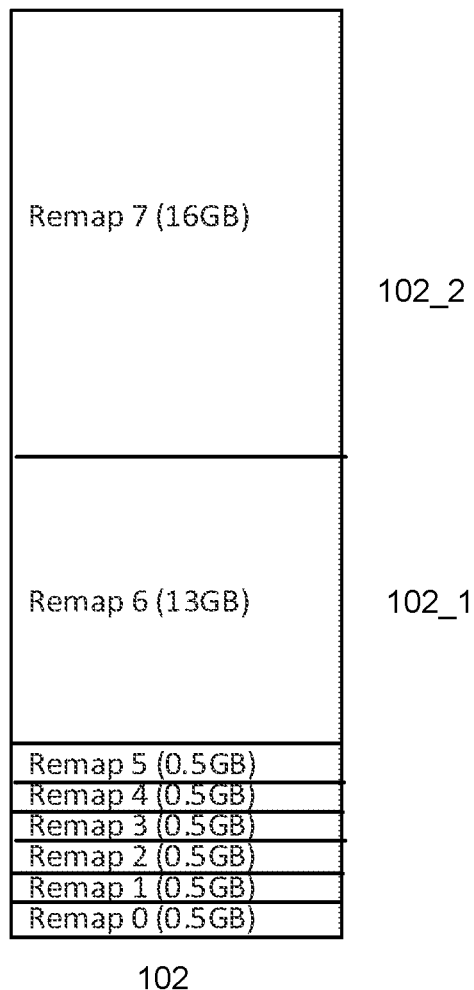
FIG. 2 depicts an example of a memory map of the memory being divided into a plurality of regions according to one aspect of the present embodiments.

In the example of FIG. 1, the memory manager 104 is configured to partition the memory 102 into a plurality of memory regions including at least a secure region 102_1 and an non-secure region 102_2. Here, the secure region 102_1 is accessible only by a trusted source 106_1 (e.g., a trusted firmware running on an ARM CPU core) of the electronic device 108. Access to the secure region 102_1 from an untrusted source 106_2, including but not limited to internal Direct Memory Access (DMA) engines configured to allow direct access the memory 102 and/or from an external device via, e.g., an PCIe interface, is blocked. The non-secure region 102_2, on the other hand, can be accessed by either a trusted source 106_1 or an untrusted source 106_2. In some embodiments, the memory manager 104 is an independent component external to the memory 102. In some embodiments, the memory manager 104 is at the destination or an internal component of the memory 102. FIG. 2 depicts an example of a memory map of the memory 102 (e.g., a DRAM), wherein the memory 102 is divided into a plurality of regions (e.g., Remap 0 to Remap 7). Each of these regions can be individually marked as a secure region 102_1 (e.g., Remap 6) or a non-secure region 102_2 (e.g., Remap 7).

In some embodiments, the memory manager 104 is programmable and is configured to dynamically demarcate different regions of the memory 102 as secure (e.g., to be accessed by a trusted source 106_1) or non-secure (to be accessed by all sources 106) based on the current access need to the data of the electronic device 108 by the sources at runtime. In some embodiments, the memory manager 104 is configured to dynamically remap or adjust/resize sizes the secure region 102_1 and/or the non-secure region 102_2 by expanding or shrinking each of the regions in the memory 102 at a certain size of granularity (e.g., 0.5 GB) and blocking certain regions of the memory 102 for access by the untrusted source 106_2 accordingly. For a non-limiting example, in the example of the memory map depicted in FIG. 2, the secure region Remap 6 can be expanded to include region Remap 5 by blocking Remap 5 out of access requests from the untrusted sources 106_2. In some embodiments, the memory manager 104 is configured to remap the memory regions by accessing and changing values in one or more memory region control registers 105s, which are utilized to mark the size or demarcation of the regions of the memory 102. In some embodiments, the memory manager 104 is configured to access the memory region control registers 105s via an ARM CPU core.

In some embodiments, each of the one or more sources 106s is configured to access the memory 102 for a read or write operation on the data and/or software associated with the electronic device 108 by generating and transmitting a read or write access request. In some embodiments, the access request includes one or more of the type of the access request (to perform a read or write operation), the secure or non-secure region of the memory 102 to be accessed as well as the source bits representing the type of the source 106 making and transmitting the access request. In some embodiments, the access request is transmitted by the source 106 via an internal register bus of the electronic device 108. In some embodiments, the access request is transmitted by the source 106 via an external interface to the electronic device 108, e.g., a PCIe interface or an I2C interface.

In some embodiments, the access request transmitted by the source 106 is accepted by the memory manager 104 configured to process the access requests to the memory 102. In some embodiments, the memory manager 104 is configured to identify the type of the source 106 making the access request by decoding the source bit(s) transmitted with the access request, and type of the region of the memory 102 the source 106 attempts to access. Based on the source type of the source 102 and the region of the memory 106 the source attempts to access, the memory manager 104 is configured to grant or deny the source 106 read and/or write access to the requested regions of the memory 102. Specifically, if an access request is granted by the memory manager 104, e.g., when the source 106 is a trusted source 106_1 and/or the memory region is non-secure region 102_2, the source 106 is allowed to proceed to read data and/or software from or write data and/or software to the requested region of the memory 102. On the other hand, if an access request is denied, e.g., when the source 106 is an untrusted source 106_2 attempting to access a secure region 102_1, the access request is dropped and a failed (e.g., 0s) signal is sent back to the source 106.

FIG. 3 depicts a flowchart 300 of an example of a process to support hardware-based memory region protection. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302, where certain data associated with an electronic device is maintained via a memory, wherein the memory is partitioned into a plurality of memory regions including a secure region and a non-secure region. The flowchart 300 continues to block 304, where an access request is generated and transmitted by a source for read or write access to one of the plurality of memory regions, wherein the source is categorized into one of a plurality of source types, wherein the source type of the source is transmitted with the access request. The flowchart 300 continues to block 306, where the access request with the source type from the source is accepted and the memory region to be accessed for a read or write operation is identified. The flowchart 300 ends at block 308, where whether to grant or deny read or write access to the memory region by the source is determined based on the source type of the source requesting access and the memory region to be accessed.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A hardware-based memory region protection mechanism, comprising:
   a memory configured to maintain certain data associated with an electronic device, wherein the memory is partitioned into a plurality of memory regions including a secure region and a non-secure region; and
   a memory manager configured to
      partition the memory into said plurality of memory regions;
      accept an access request from a source for read or write access to one region of the plurality of memory regions with a source type from the source and identify the memory region to be accessed for a read or write operation, wherein the source is assigned with one or more source bits to identify the source type of the source, and wherein the one or more source bits assigned to the source are maintained within a hardware component associated with the source, wherein the hardware component is unmodifiable by software; and
      determine whether to grant or deny read or write access to the memory region by the source based on the source type of the source requesting access and the memory region to be accessed.

2. The hardware-based memory region protection mechanism of claim 1, wherein:
   the certain data associated with the electronic device includes one or more of status, information, and software related to one of operations, security, and intellectual property (IP) of the electronic device.

3. The hardware-based memory region protection mechanism of claim 1, further comprising:
   said source configured to generate and transmit the access request for read or write access to the one region of the plurality of memory regions, wherein the source is categorized into one of a plurality of source types, wherein the source type of the source is transmitted with the access request.

4. The hardware-based memory region protection mechanism of claim 1, wherein:
   the source is categorized as one of a trusted source that is trusted by the electronic device to securely access the secure and the non-secure region of the memory, and an untrusted source that is untrusted by the electronic device and is blocked from accessing the secure region of the memory.

5. The hardware-based memory region protection mechanism of claim 4, wherein:
   the untrusted source is only allowed to access the non-secure region of the memory.

6. The hardware-based memory region protection mechanism of claim 4, wherein:
   the secure region of the memory is accessible only by the trusted source while access to the secure region by the untrusted source is blocked.

7. The hardware-based memory region protection mechanism of claim 4, wherein:
the non-secure region of the memory is accessible by either the trusted source or the untrusted source.

8. The hardware-based memory region protection mechanism of claim 1, wherein:
the access request includes one or more of type of the access request, the memory region of the memory to be accessed, and the one or more source bits representing the type of the source making the access request.

9. The hardware-based memory region mechanism of claim 1, wherein:
the memory manager is programmable and configured to dynamically demarcate different regions of the memory based on current access need to the data of the electronic device by the source at runtime.

10. The hardware-based memory region mechanism of claim 1, wherein:
the memory manager is configured to dynamically remap or adjust sizes of the secure region and/or the non-secure region by expanding or shrinking each of the memory regions in the memory at a certain size of granularity and blocking certain memory regions of the memory accordingly.

11. The hardware-based memory region mechanism of claim 10, wherein:
the memory manager is configured to remap the memory regions by accessing and changing values in one or more memory region control registers that are utilized to mark the size or demarcation of the regions of the memory.

12. The hardware-based memory region mechanism of claim 1, wherein:
the memory manager is configured to identify the type of the source making the access request by decoding the one or more source bits transmitted with the access request.

13. The hardware-based memory region mechanism of claim 4, wherein:
the memory manager is configured to grant the access request to proceed to read data from or write data to the requested region of the memory if the source is the trusted source and/or the memory region is a non-secure region.

14. The hardware-based memory region mechanism of claim 4, wherein:
the memory manager is configured to deny the access request and send a failed signal back to the source if the source is the untrusted source attempting to access a secure region.

15. A method to support hardware-based memory region protection, comprising:
maintaining data associated with an electronic device via a memory, wherein the memory is partitioned into a plurality of memory regions including a secure region and a non-secure region;
assigning a source with one or more source bits to identify a source type of the source;
maintaining the one or more source bits assigned to the source within a hardware component associated with the source, wherein the hardware component is unmodifiable by software;
generating and transmitting an access request by the source for read or write access to one region of the plurality of memory regions, wherein the source is categorized into one of a plurality of source types, wherein the source type of the source is transmitted with the access request;
accepting the access request with the source type from the source and identifying the memory region to be accessed for a read or write operation; and
determining whether to grant or deny read or write access to the memory region by the source based on the source type of the source requesting access and the memory region to be accessed.

16. The method of claim 15, further comprising:
categorizing the source as one of a trusted source that is trusted by the electronic device to securely access the secure region of the memory, and an untrusted source that is untrusted by the electronic device and is blocked from accessing the secure region of the memory.

17. The method of claim 16, further comprising:
allowing the untrusted source to only access the non-secure region of the memory.

18. The method of claim 16, wherein:
the secure region of the memory is accessible only by the trusted source while access to the secure region by the untrusted source is blocked.

19. The method of claim 16, wherein:
the non-secure region of the memory is accessible by either the trusted source or the untrusted source.

20. The method of claim 16, further comprising:
granting the access request to proceed to read data from or write data to the requested region of the memory if the source is a trusted source and/or the memory region is a non-secure region.

21. The method of claim 16, further comprising:
denying the access request and sending a failed signal back to the source if the source is an untrusted source attempting to access a secure region.

22. The method of claim 15, further comprising:
identifying the type of the source making the access request by decoding the one or more source bits transmitted with the access request.

23. The method of claim 15, further comprising:
programming and dynamically demarcating different regions of the memory based on current access need to the data of the electronic device by the source at runtime.

24. The method of claim 15, further comprising:
dynamically remapping or adjusting sizes of the secure region and/or the non-secure region by expanding or shrinking each of the memory regions in the memory at a certain size of granularity and blocking certain memory regions of the memory accordingly.

25. The method of claim 24, further comprising:
remapping the memory regions by accessing and changing values in one or more memory region control registers that are utilized to mark the size or demarcation of the regions of the memory.

26. A hardware-based memory region protection mechanism, comprising:
a storage means configured to maintain certain data associated with an electronic device, wherein the storage means is partitioned into a plurality of storage regions including a secure region and a non-secure region; and
a memory managing means configured to
partition the storage means into said plurality of memory regions;
assign a source with one or more source bits to identify a source type of the source;

maintain the one or more source bits assigned to the source within a hardware component associated with the source, wherein the hardware component is unmodifiable by software;

accept an access request from the source for read or write access to one region of the plurality of storage regions with the source type from the source and identify the storage region to be accessed for a read or write operation; and determine whether to grant or deny read or write access to the storage region by the source based on the source type of the source requesting access and the storage region to be accessed.

\* \* \* \* \*